United States Patent [19]

Suematsu

[11] Patent Number: 5,418,716
[45] Date of Patent: May 23, 1995

[54] SYSTEM FOR RECOGNIZING SENTENCE PATTERNS AND A SYSTEM FOR RECOGNIZING SENTENCE PATTERNS AND GRAMMATICAL CASES

[75] Inventor: Hiroshi Suematsu, Tokyo, Japan

[73] Assignee: NEC Corporation, Japan

[21] Appl. No.: 557,833

[22] Filed: Jul. 26, 1990

[51] Int. Cl.$^6$ ............................................. G06F 15/38
[52] U.S. Cl. ........................... 364/419.01; 364/419.02; 364/419.08
[58] Field of Search .............. 364/419, 419.01, 419.04, 364/419.08

[56] References Cited

U.S. PATENT DOCUMENTS

| | | | |
|---|---|---|---|
| 4,868,750 | 9/1989 | Kucera et al. | 364/419 |
| 4,914,590 | 4/1990 | Loatman | 364/419 |
| 4,916,614 | 4/1990 | Kaji et al. | 364/419 |
| 5,099,425 | 3/1992 | Kano et al. | 364/419 |
| 5,146,406 | 9/1992 | Jensen | 364/419 |
| 5,277,971 | 7/1993 | Nakajima et al. | 364/419 |

FOREIGN PATENT DOCUMENTS 60-120433  11/1985  Japan .
2112068    9/1990   Japan .

Primary Examiner—Robert A. Weinhardt
Assistant Examiner—A. Bodendorf
Attorney, Agent, or Firm—Sughrue, Mion, Zinn, Macpeak & Seas

[57] ABSTRACT

A slot table contains (1) all possible sentence patterns (VPs), arranged in rows, which a predicate in an input sentence can take, and (2) arguments of the VPs expressed as slot conditions in slots positioned in a finite number of positions. A grammatical case pattern table contains columns corresponding to respective grammatical cases of the basic patterns arranged in the order in which the cases appear in a basic pattern before shifting; all the grammatical case patterns are expressed as binary values representing existing/non-existing ones of the respective grammatical cases in respective rows corresponding to the grammatical case patterns. The binary values are added up to numbers of the position information in the basic pattern, and the grammatical cases, which correspond to columns that correspond to the last number among numbers of the binary values, are treated as grammatical cases for arguments of the VP. One position on the slot table is selected with respect to candidates for arguments of VPs in the input sentence, and a candidate's features are compared with the slot conditions of all possible VPs in slots in the same position. Plural VPs are processed in parallel by recognizing as being appropriate only those VPs with slots whose slot conditions match the candidate's features, and only the grammatical cases that have been described in the slots of such recognized VPs are recognized as appropriate. Because a finite number of positions is set on the slot table, comparison of slot conditions, in positions other than the specific position, with candidate's features is unnecessary.

6 Claims, 7 Drawing Sheets

FIG. 2(a)

SUB, IOB, DOB, COMP : GRAMMATICAL CASE

| | |
|---|---|
| SENTENCE PATTERN 1 | SUB + V |
| SENTENCE PATTERN 2 | SUB + V + COMP |
| SENTENCE PATTERN 3 | SUB + V + DOB |
| SENTENCE PATTERN 4 | SUB + V + IOB + DOB |
| SENTENCE PATTERN 5 | SUB + V + DOB + COMP |

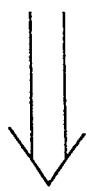

CONVERSION BY A POSITION RELATIVE TO VERB

| | POSITION 1 | POSITION 2 | POSITION 3 | POSITION 4 |
|---|---|---|---|---|
| SENTENCE PATTERN 1 | SUB's FEATURES | | | |
| SENTENCE PATTERN 2 | SUB's FEATURES | COMP's FEATURES | | |
| SENTENCE PATTERN 3 | SUB's FEATURES | DOB's FEATURES | | |
| SENTENCE PATTERN 4 | SUB's FEATURES | IOB's FEATURES | DOB's FEATURES | |
| SENTENCE PATTERN 5 | SUB's FEATURES | DOB's FEATURES | COMP's FEATURES | |

FIG. 2(b)

| | | |
|---|---|---|
| SENTENCE PATTERN 1 | GA + V | |
| SENTENCE PATTERN 2 | GA + NI + V | |
| SENTENCE PATTERN 3 | GA + WO + V | |
| SENTENCE PATTERN 4 | GA + NI + WO + V | |
| SENTENCE PATTERN 5 | GA + WO + TO + V | |

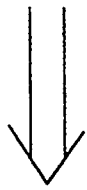

POSITION CONVERSION BY SURFACE GRAMMATICAL CASE

| | POSITION GA | POSITION WO | POSITION NI | POSITION TO |
|---|---|---|---|---|
| SENTENCE PATTERN 1 | GA'S FEATURES | | | |
| SENTENCE PATTERN 2 | GA'S FEATURES | | NI'S FEATURES | |
| SENTENCE PATTERN 3 | GA'S FEATURES | WO'S FEATURES | | |
| SENTENCE PATTERN 4 | GA'S FEATURES | WO'S FEATURES | NI'S FEATURES | |
| SENTENCE PATTERN 5 | GA'S FEATURES | WO'S FEATURES | | TO'S FEATURES |

FIG. 4(a)

ANALYSIS : SURFACE FEATURES

VERB : give

| P 1 | P 2 | P 3 | P 4 | MEANINGS |
|-----|-----|-----|-----|----------|
| S | | | | YIELD TO PRESSURE |
| S | P P | | | HAND OVER SOMETHING |
| S | DOB | | | HAND OVER |
| S | IOB | DOB | | HAND OVER |
| S | DOB | P P | | ENTRUST |
| S | IOB | DOB | COMP | HAND OVER IN A STATE OF |
| S | IOB | DOB | P P | CAUSE SOMEBODY TO HAVE IN EXCHANGE FOR |
| S | DOB | COMP | | CAUSE SOMEBODY TO DO |

FIG. 4(b)

GENERATION : DEEP FEATURES

CONCEPTUAL SYMBOL : HAND OVER

| P 1 | P 2 | P 3 | P 4 | SURFACE WORDS |
|-----|-----|-----|-----|---------------|
| S | DOB | | | give |
| S | IOB | DOB | | give |
| S | DOB | P P | | give |
| S | DOB | | | present |
| S | DOB | P P | | present |
| S | IOB | DOB | | award |
| S | DOB | P P | | award |

FIG. 5

| NAME OF GRAMMATICAL CASE PATTERN | GRAMMATICAL CASE | | | | | |
|---|---|---|---|---|---|---|
| | SUB | IOB | DOB | PREP | COMP | CONJ |
| 1 | 1 | 0 | 0 | 0 | 0 | 0 |
| 2 | 1 | 0 | 0 | 0 | 1 | 0 |
| 3 | 1 | 0 | 0 | 1 | 0 | 0 |
| 4 | 1 | 1 | 0 | 0 | 1 | 0 |
| 5 | 1 | 0 | 0 | 0 | 0 | 1 |
| 6 | 1 | 0 | 1 | 1 | 1 | 0 |
| 7 | 1 | 1 | 1 | 0 | 0 | 0 |
| 8 | 1 | 0 | 1 | 0 | 0 | 0 |
| 9 | 1 | 0 | 1 | 1 | 0 | 0 |
| 10 | 1 | 0 | 1 | 0 | 1 | 1 |
| 11 | 1 | 0 | 1 | 0 | 0 | 0 |
| 12 | 1 | 1 | 1 | 0 | 1 | 0 |

1 : EXISTING
2 : NON EXISTING

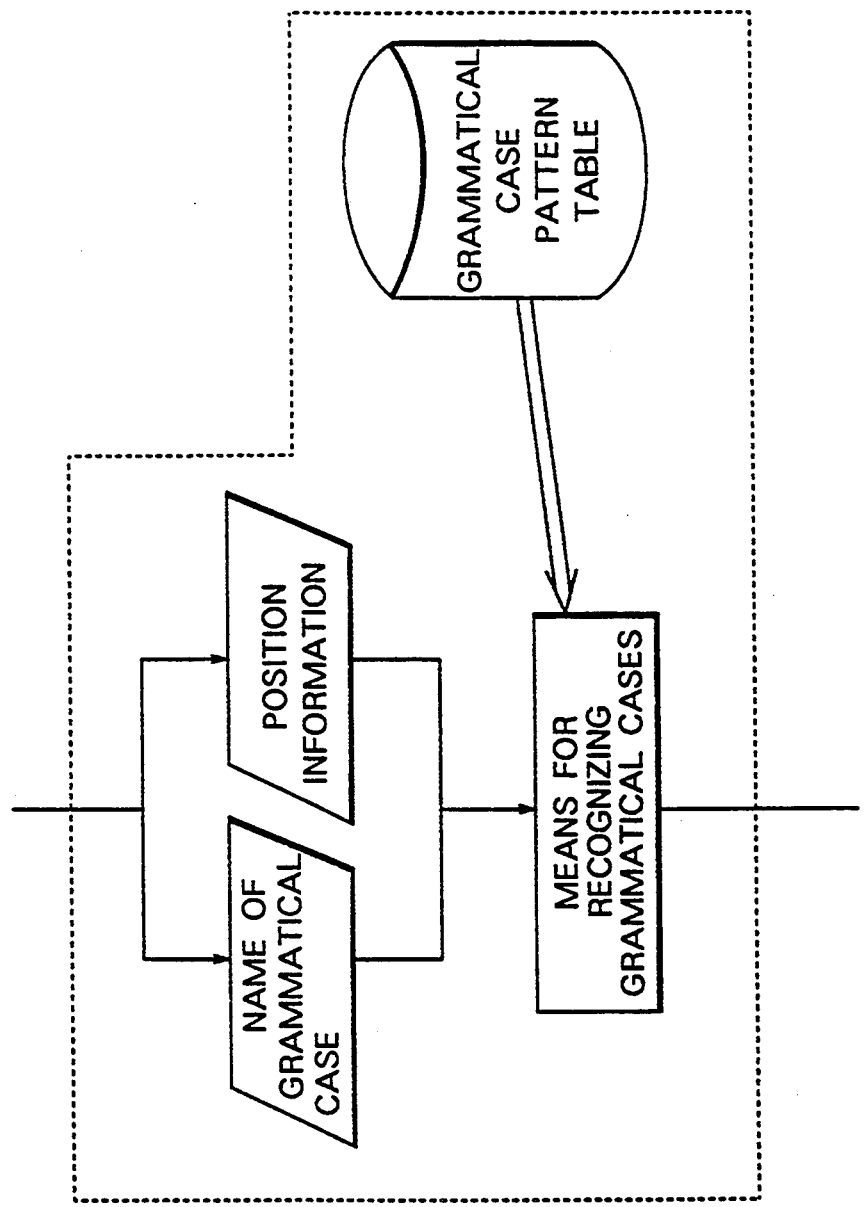

SYSTEM FOR RECOGNIZING SENTENCE PATTERNS AND A SYSTEM FOR RECOGNIZING SENTENCE PATTERNS AND GRAMMATICAL CASES

BACKGROUND OF THE INVENTION (In the following description, numbers in brackets following a term refer to corresponding numbers in the GLOSSARY at the end of the description.)

The present invention relates to a system for recognizing sentence patterns (VPs) and grammatical cases (grammatical functions) which appear in sentences of a source language[1], i.e., input sentences, in syntactic and semantic analyses of the sentences. This invention is intended particularly for natural language understanding systems and machine translation (MT) systems which are categorized under natural language processing (NLP) systems.

Before a presentation of the summary and details of the invention, the following definitions of a sentence pattern (VP) and grammatical cases will be presented.

Sentence patterns (VPs) basically are the classification of sentences in terms of a predicate verb and the grammatical functions which its arguments[2] bear, such as subject (SUB), indirect object (IOB), direct object (DOB), complement (COMP), and adverbial (A); see Quirk, et al. (1972) 343ff. More intuitively, these sentences are subdivisions and extensions of the natural classification of "five basic sentence patterns" as shown below:

| VP1 | SUB + V | V: Complete Intransitive Verb Ex. Fire burns. |
| --- | --- | --- |
| VP2 | SUB + V + COMP | V: Incomplete Intransitive Verb Ex. He became a merchant. |
| VP3 | SUB + V + DOB | V: Complete Transitive Verb Ex. He likes English best. |
| VP4 | SUB + V + IOB + DOB | V: Dative Verb Ex. He gave me a book. |
| VP5 | SUB + V + DOB + COMP | V: Incomplete Transitive Verb Ex. He made us happy. |

Hornby (1975) and Palmer (1951) use the term "verb pattern" instead, since the sentence pattern can be regarded as the "subcategorization" of the predicate verb in terms of the grammatical functions, as is clear from the above definition. Some other grammarians use "clause patterns" to avoid confusion with a sentence in a broad sense; see Quirk et al. (1972).

There is a slight difference between the notions of "sentence patterns" and "verb patterns." The former term applies to grammatical functions expressed in "sentence surface", rather than to the functions determined by the predicate verb.. For example, the sentence pattern SUB+V+DOB changes to SUB+V in passivization[3]. The value of the latter term, however, stays the same (i.e. a complete transitive verb: SUB+V+DOB), because its characteristic as a subcategorization is invariable through transforms.

This application uses the term "sentence pattern", with "VP" as its abbreviation, implying the subcategorization of the predicate/predicative, because the invariable portion of the predicate-argument structure is focused upon. The term "sentence pattern" is used instead of "verb pattern" because it is a more accepted term in grammar, and because the concept of subcategorization applies not only to the verb but also to the other parts of speech, e.g., adjectives, nouns, prepositions, and adverbs.

This application uses the most widely accepted terms and definitions for functional categories of arguments, as listed below[4].

Subject (SUB):
  A nominal argument which controls the inflection of the predicate verb in the form of NOM + V. NOM is an argument with nominal function.
  Characteristics:
  1. Becomes the first candidate for the antecedent of a reflexive pronoun; and
  2. Takes nominative case in the declension.

Direct Object (DOB):
  A nominal argument which receives performance expressed by the predicate verb in the form of V + NOM.
  Characteristics:
  1. Usually expresses inanimate things;
  2. Takes objective (accusative) case in pronominal expression; and
  3. Located after a verb and an indirect object.

Indirect Object (IOB):
  A nominal argument which is related through a DOB in the form of V + NOM.
  Characteristics:
  1. Usually expresses a human being;
  2. Takes objective (dative) case in pronominal declension; and
  3. Located before a direct object.

Complement (COMP):
  An argument with nexus relationship with the subject/object.
  Characteristics:
  1. Impassivizable; and
  2. Takes nominative/objective case in pronominal declension, respectively.

Adverbial (A):
  An adverbial argument. This category includes a prepositional phrase (PP), an adverbial particle (PCL) [5], an adverbial clause (CONJ), and an adverb proper (ADV).
  Characteristics:
  1. Typically a space adverbial; and
  2. Relatively fixed compared with other optional adverbials.

Several other criteria are needed besides these definitions since there are arguments which can be classified in more than one category in the same sentence according to these definitions. There are supplementary criteria with respect to passivizability, wh-word categories in interrogative and relative expressions, mobility in word-order, typical semantics, etc.

Sentence patterns (VPs) are further subcategorized according to syntactic and semantic constraints on various aspects of a pattern to lexically dependent levels, as shown by the works of Hornby (1975) and Palmer (1951) and many lexicographical works of the dictionaries, such as the Oxford Advanced Learner' Dictionary of Current English (OALD), and the Longman Dictionary of Contemporary English (LDOCE). Syntactic constraints are syntactic forms[6], transform possibilities[7], relationships among arguments, and so forth. Semantic constraints are such as inhibited semantics and preference semantics on the argument.

In coping with this further subcategorization, the term, sentence pattern (VP), is re-defined to be as follows:

a subcategorization of the predicate/predicative in terms of grammatical functions (grammatical cases) of its arguments with syntactic and semantic constraints such as syntactic forms, separability, mobility, and inhibitional and preference semantics on the arguments.

When only the aspect of grammatical functions is concerned, i.e., disregarding other syntactic and semantic constraints, the term "grammatical case pattern" is used instead in this application.

The term "grammatical case" is used for "grammatical functions" of arguments in this application because the notion of grammatical "case" is basically the same as that of the grammatical function though there are some differences in categoric setups. The grammatical term "case" applies to "formal" categories of nouns/noun-equivalents for their syntactic relations with the predicate or with other nouns/noun-equivalents (e.g. nominative, dative, accusative, and genitive). The "grammatical functions" described above are "functional" categories with consideration on the argument's "form." The difference is only the focus on the different aspects (form vs. function) of the same phenomenon. The adjective "grammatical" is used in order to distinguish it from "semantic cases" (i.e. semantic roles) which have been proposed by Ch. J. Fillmore (1968).

This application regards a prepositional phrase (PP), an adverbial particle (PCL), and a clause with a conjunction (CONJ) as VP elements because these are subcategorized for by the predicate verb in relation to its meanings, just like the other VP elements.

By this definition, a VP can be summarized to have the following major characteristics: First, a VP presents a characteristic as a structure, and all VP arguments are directly dominated by the predicate in syntax; second, it presents dependency with both the meaning and the predicate; third, it shows objective word-order among arguments; fourth, it shows syntactic constraints on arguments, such as syntactic forms and transform possibilities; and fifth, it shows semantic constraints on the argument, such as inhibited semantics and typical semantics.

Pre-existing VP recognition methods will be shown below, and their problems will be discussed.

In the system of syntactic analysis, conventionally there are two known methods for recognizing VPs of input sentences. One method is the ordinary one that involves "backtracking": a single VP is hypothesized in turn from the stock of VPs available to a predicate by a backtracking process until a VP without a matching failure is detected. The arguments of the hypothesized VP are compared, in order, with the candidates in the input sentence. The other method is to provide all VPs available to a predicate in the form of a "list," and to compare all arguments of all available VPs with each candidate in the sentence in the depth-first manner. A VP(s) with maximum satisfaction and with fewest gaps is selected. These methods are described below in detail.

In the former method, one VP is hypothesized among VPs available[8] to a predicate, and under this hypothesis, the syntactic analysis of the input sentence is carried out by comparing feature values[9] of a candidate[10] with the feature-values of arguments of the hypothesized VP. The comparison is carried out for each of the corresponding features of the candidate and the argument for all features described.

If the candidate can satisfy[11] any argument, the next candidate is compared with the rest of the arguments of the VP. If this next candidate can satisfy any argument, the following next candidate is compared with the rest of the arguments of the VP.

When there is still an argument which has to be satisfied, but there is no appropriate candidate available in the input sentence, or when there is a candidate which has to be recognized as an argument but there is no argument available in the focused VP, pattern matching is regarded as a failure, and a backtracking[12] is triggered: The process goes back to the point where the ambiguity of the VP has appeared, and another VP is hypothesized instead of the focused VP among the rest of VPs available to the predicate.

This operation is repeated until a VP is found in which all arguments of the hypothesized VP match the candidates, and this VP is recognized as the VP of the predicate in the input sentence.

Then, in the latter method, all VPs available to a predicate in the input sentence are expressed as a list, and arguments of these VPs are regarded as "slots." Constraints on an argument are expressed as "slot conditions" in a slot on the list. All arguments (slots) of all available VPs are compared for each candidate (filler) in the sentence in the depth-first manner. This operation is repeated for other candidates, and a VP(s) with maximum satisfaction and with fewest gaps is recognized to be the VP of the input sentence.

Since the grammatical cases can be obtained after a VP is identified as a result of the analysis, the identification of the grammatical case for an argument was not necessary for recognizing a VP. Therefore, in the prior art, a system for recognizing the grammatical case does not exist since its significance has not been recognized, and proper information has not been implemented in the system.

In the first method, the selection of VPs depends on the hypothetical order among available VPs. If the trial order is arranged from VPs which have the maximum number of arguments among available ones, with a view to preferentially recognizing this kind of VP, the number of times of backtracking increases since this kind of VP does not necessarily appear frequently. This is because frequently appearing VPs have relatively fewer arguments. When the trial order is arranged in the order of frequency of VPs, there is a possibility of failing to recognize an argument of a VP that should be recognized.

The second method is free from the problem in the first method. However, there is a problem of a fairly large amount of comparison of candidate's features with the slot conditions. In handling one list of VPs, the amount of comparison of candidate's features with the slot conditions is approximately several times larger than the number of VPs. Therefore, there is a problem that fairly large man-hour and processing time are needed.

Moreover, an even greater problem is found in both methods: linguistic characteristics observed in arguments' positions which are determined in relation to the predicate are not distinguished. The relative positions of arguments have the roles of signifying the subject of predication, possibilities of transforms, restriction of extension, and so forth. Control of these roles becomes possible only when the relative position can be managed through all available VPs.

Therefore, the development of a system that can easily reflect these linguistic characteristics is needed.

Further, it has become clear that grammatical cases are concepts common to all natural languages, that they are closely related to the declension of pronouns, and that they are useful as expressions of semantic roles for arguments of a VP in relation to the predicate, and as information for the analysis and generation of a sentence. Therefore, there has been a long felt need for the development of a system for effectively recognizing the grammatical cases.

SUMMARY OF THE INVENTION

It is one object of the present invention to provide a system which effectively recognizes VPs and grammatical cases, in which the above-mentioned problems are solved, in which the number of times of the comparison of a candidate's features with slot conditions is decreased, and which can easily reflect these linguistic characteristics.

It is another object of the present invention to provide such a system which also makes systematic control of grammatical cases possible so that understanding, control, and alternation are easy.

Another object of the present invention is to provide a natural language processing system for recognizing VPs and grammatical cases, and comprising:

a means for providing a slot table, i.e., a table which has all VPs, available to a predicate in an input sentence, arranged in plural rows, and which has arguments of the VPs expressed as slot conditions in slots positioned in a finite number of positions; and a means for processing a plurality of VPs in parallel, and which includes a means for comparing features of candidates for arguments of VPs in the input sentence which slot conditions of the slots that belong to a selected position on the slot table through all available VPs, by which only VPs with slots whose conditions match a candidate's features are recognized as matched VPs, and by which only grammatical cases that have been described in the slots of the matched VPs are recognized as matched grammatical cases.

Another object of the present invention is to provide such a natural language processing system which further comprises:

a grammatical case pattern table, i.e. a table which has columns corresponding to grammatical cases that are arranged in an objective word order, i.e. the order found among grammatical cases when they are not affected by any transformer[13], and which has rows corresponding to all grammatical case patterns expressed as binary values representing existing/non-existing ones of grammatical cases; and a means for converting position information described in slots of the slot table, to grammatical cases. Also included is a means for adding up numbers of the values, representing existing/non-existing ones of grammatical cases for the grammatical case patterns corresponding to VPs, until the sum of these numbers adds up to the number of the position information in the basic pattern. By this process, the grammatical cases, corresponding to columns which correspond to the last number among numbers of the values representing existing/nonexisting ones of grammatical cases which have been added up, are treated as grammatical cases for elements of possible VPs, and the values of grammatical cases are described on the corresponding slots in the slot table.

In the present invention, the technical term "predicate" includes a "declinable part of speech in the Japanese language", as well as "a predicate in European languages such as English," namely "the part of a sentence, clause, or phrase of a verb with or without objects, complements, or adverbial modifiers". This term also applies to "predicatives".

In the present invention, in the English-language processing system, positions on the slot table are set by the location of arguments in relation to the predicate. On the other hand, in the Japanese-language processing system, positions on the slot table are set by case markers.

In the present invention, the slot table can be formed for use in the analysis, or can be formed for use in the generation of sentences in NLP (Natural Language Processing).

In the present invention, the means for providing the slot table comprises the means for extracting all VPs available to a predicate in the input sentence, a slot table template, and the means for converting information, on all the VPs available to a predicate in the input sentence, to the position information on the slot table by using the slot table template.

In the present invention, the means for comparing the candidate's features with the slot conditions of the slots which belong to a selected position, through a slot table of all available VPs, comprises the means for handling the slot table by slot table handling functions[14].

In the present invention, the existence and non-existence of a grammatical case are expressed as 1 and 0, respectively.

In a system for recognizing VPs according to the present invention, because a finite number of positions is set on the slot table, comparison of the slot conditions, in slots in positions other than the specific position, with candidate's features is unnecessary. Therefore, the number of times of comparison is decreased to one-to-several parts as compared with that in the prior art, which results in a decrease in manpower for processing and in an increase in processing speed.

Further, in a method for recognizing grammatical cases according to the present invention, because the grammatical cases are controlled systematically, it is easy to understand, control, and alter the grammatical cases.

A natural language processing system according to the present invention plays key roles in linking the sentence and the conceptual dependency structure. This system not only provides efficient simultaneous VP selection by comparing candidate's features with feature bundles of arguments that belong to the same position defined by relative distance to the predicate/predicative, but also provides a means to reflect the language's syntactic and semantic characteristics that reside in these positions.

The systems according to the present invention are appropriate for structural and isolated languages that feature basic word order and regular argument movement in a sentence.

BRIEF DESCRIPTION OF THE DRAWINGS

FIG. 2(a) and FIG. 2(b) show examples of the conversion of information on a VP to a slot table, FIG. 2(a) showing an English-language example of the conversion of information on VPs to a slot table, and FIG. 2(b) showing a Japanese-language example of the conversion of information on case markers to a slot table;

FIG. 4(a) illustrates an English-language slot table used in the analysis for the verb "give";

FIG. 4(b) illustrates an English-language slot table used in the generation for the meaning "hand over";

FIG. 5 shows an example of an English-language grammatical case pattern table; and FIG. 6 shows the means for converting position information to a value of grammatical cases.

DETAILED DESCRIPTION OF THE INVENTION

Preferred embodiments of the present invention will be explained with reference to FIGS. 1 to 6.

Figure 1:
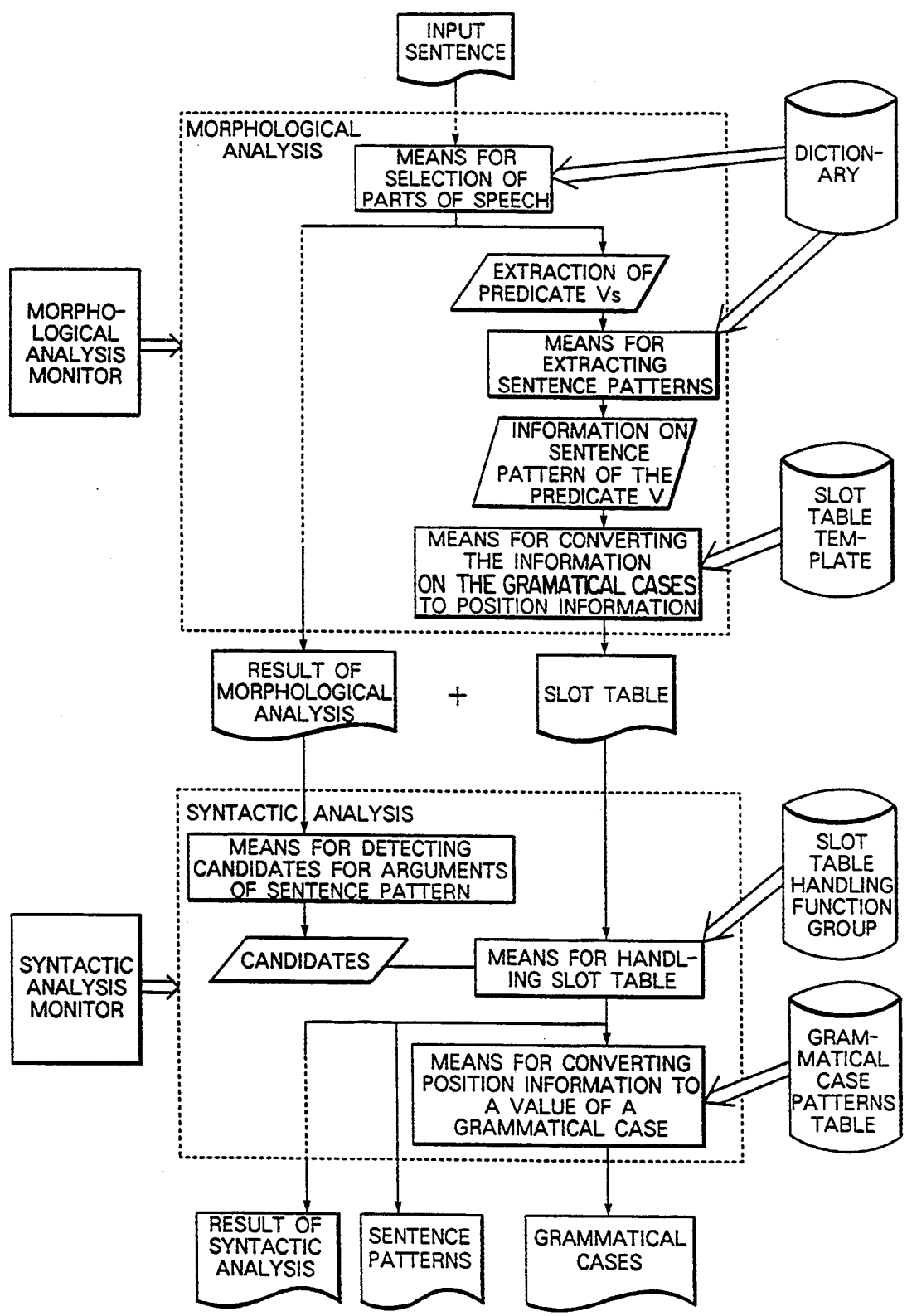
FIG. 1 is a flowchart of an example of the analysis of a sentence by a method of recognizing VPs and grammatical cases thereof according to the present invention.

FIG. 1 shows a flowchart of a natural language analyzing approach according to the present invention. An input sentence[15] is divided into words, which are the smallest units of meanings[16], by using a dictionary in morphological analysis (a dictionary look-up process), and possible parts of speech are assigned to several words by a means for the selection of parts of speech[17]. A word information signal is outputted from the means for the selection of parts of speech into a means for extracting VPs for a predicate in the input sentence; and for a word that has a possibility to be recognized as a predicate[18], all VPs available to the word are extracted from the dictionary by a means for extracting VPs for a predicate in the input sentence.

A signal of extracted information on VPs is outputted from the means for extracting VPs for a predicate in the input sentence into a means for converting information on VPs to slot conditions, and extracted information on VPs is converted to a table containing all VPs available to the predicate and arranged in rows, and containing arguments of the VPs expressed as slow conditions in slots positioned in a finite number[19] of positions (this table is referred to as a "slot table"), by the means for converting information on VPs to slot conditions, and by using a slot table template[20]. In this process, for each Vp of the slot table grammatical cases are allocated to all arguments (i.e. slots) of a VP by the numbers described in the slots showing their positions in the basic pattern (referred to as "position information"), by a name of the grammatical case pattern corresponding to the VP in which these slots exist, by the means for converting position information to names of grammatical cases, and by using a grammatical case pattern table.

At the same time, lexically given surface features[21] and also deep features[22], which correspond to the grammatical case in the VP, are transcribed into the same slot from the dictionary by a means for transcribing dictionary information on grammatical cases to slots. On the other hand, a signal of results of morphological analysis with respect to the input sentence is outputted from the means for selecting parts of speech into a means for detecting candidates for arguments of VPs, and results of morphological analysis with respect to the input sentence are collected as candidates, to such an extent that the results of morphological analysis can form arguments of VPs in analysis, by the means for detecting candidates for arguments of VPs.

Although, the relation between predicates and meanings is one-to-many from either side[23], both of them have close relationships with VPs. Hence, their appropriate correspondences can be detected by selecting VPs. In the analysis, all meanings available to the predicate are assigned available VPs, which are expressed in a slot table format; and slot conditions of arguments (i.e. slots) lying in the same position are compared with feature-values of a candidate as follows. A signal of the candidate's feature-values is outputted from the means for detecting candidates for arguments of VPs into a means for handling a slot table, and the values are inserted in one position on the slot table by the means for handling a slot table and by using slot table handling functions[24], and are compared with the slot conditions in the slots of all available VPs. If there is a slot where all slot conditions match the candidate's feature-values, the candidate is recognized as an argument of VPs, only VPs having the satisfying slots are regarded as matched VPs, the VPs which don't have any more slots other than the matched slots are left as "exactly matched VPs," and the satisfactory slots through all available VPs are filled, while VPs that don't have a satisfactory slot are discarded. In this process, only grammatical cases that have been described in the slots of the VPs which have been recognized as matched VPs are recognized as matched grammatical cases. As long as there is an untilled slot in the slot table, this process is repeated. However, when there are no more candidates available to the predicate in the input sentence, VPs with the greatest number of satisfactory slots which have been filled and with fewest untilled slots are recognized as VPs for the predicate in the input sentence.

FIG. 2(a) and FIG. 2(b) show examples of the conversion of information on VPs for the predicate to the slot table. FIG. 2(a) shows an English-language example, and FIG. 2(b) shows a Japanese-language example. In the English example, positions on the slot table are set by arguments' locations in relation to the predicate. Subjects (SUBs) are set to position 1, and complements (COMPs), direct objects (DOBs), indirect objects (IOBs), etc., located immediately after the predicate are set to position 2. Further, other arguments located immediately after arguments in position 2 are set to position 3, and position 4 is set in a similar way to position 3.

In the Japanese example, positions are set by case markers[25]. The argument whose case marker is "ga" after a certain shifting[26] is set to position GA, and the argument whose case marker is "wo" after a certain shifting is set to position WO.

Figure 3A:
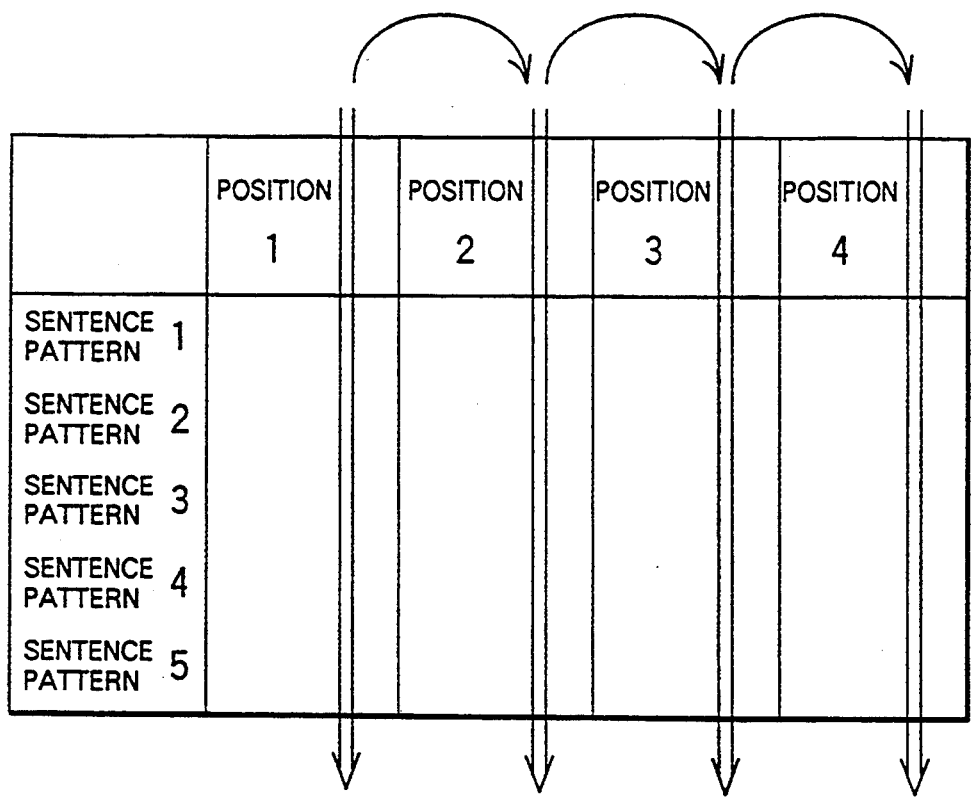
FIG. 3(a) and FIG. 3(b) shows examples of methods of selecting position on the slot table, FIG. 3(a) showing an English-language example thereof, and FIG. 3(b) showing a Japanese-language example thereof.
Figure 3B:
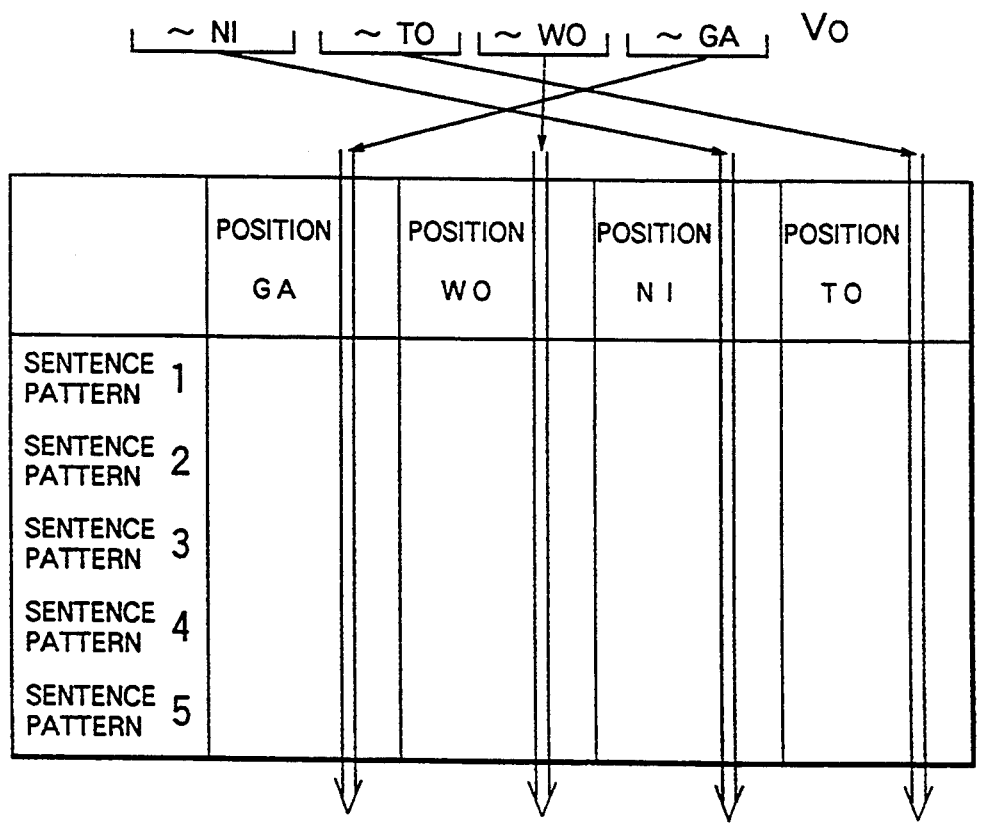

The selection of a position is made from the position 1 to the position 2 and the position 3, in order, in the English example shown in FIG. 3(a). In the Japanese example shown in FIG. 3(b), the selection of a position is made by referring to a spelling of the case marker of the candidate for an element of VPs.

FIG. 4(a) illustrates a slot table used in the analysis for the verb "give." For the meaning "hand over," available VPs SUB+V+DOB and SUB+V+IOB+DOB are assigned in the English slot table format.

In the generation of sentences in NLP, surface words, instead of predicate's meanings, available to a meaning are assigned available VPs, and slot conditions of deep features, such as a semantic case, theme, pragmatics, and extension of slots lying in the same position, are compared with feature-values of a dependent in the conceptual dependency structure[27]. In a similar way with the analysis, the correspondence with the surface word is obtained at the same time as obtaining matched VPs.

FIG. 4(b) illustrates an English slot table used in the generation for the meaning "hand over." The word "give" is assigned three VPs, SUB+V+DOB, SUB+V+IOB+DOB, and SUB+V+DOB+PP in the English slot table format.

Since multiple grammatical cases correspond to each position except for the subject position, position information[28] alone does not provide the correspondence between the argument and the grammatical case. Therefore, by assigning a grammatical case pattern number to each VP, by using a means for converting position information to a value of grammatical cases, and by using a grammatical case pattern table, each argument's position information is converted to a value of grammatical case.

FIG. 6 illustrates the means for converting position information to a value of grammatical cases. This means comprises a means for assigning grammatical cases that assigns a grammatical case from a name of a grammatical case pattern and the position information by means of the grammatical case pattern table.

A grammatical case pattern table is a table which has columns corresponding to grammatical cases which are arranged in the objective word order, i.e. the order found among grammatical cases when they are not affected by any transform[29], and having rows corresponding to all grammatical case patterns, where they are expressed as binary representations of existing/non-existing ones of grammatical cases.

FIG. 5 shows an example of English grammatical case pattern table. A row is selected by a name of the grammatical case pattern corresponding to the VP, and "1" s in the row are added, from left to right, up to the number which coincides with the position information described in the satisfying slot, and the grammatical case corresponding to the column of the last "1" is treated as the grammatical case of the slot. For example, "1" in the row numbered "7" in the DOB column means that VPs whose grammatical case pattern number is 7 take a DOB as the second argument in objective order.

In the grammatical case pattern table, the existence/non-existence of a certain grammatical case is expressed as 1/0, respectively. However, all expressions of two values corresponding to these are included within the scope of the present invention.

In this embodiment, grammatical cases are formed after forming the slot table; however, in a modification the grammatical cases can be formed in the step of forming the slot table.

While there have been herein shown and described the preferred embodiments of the present invention, it is to be understood that the invention may be embodied, otherwise than are herein illustrated and described, and that within said embodiment, certain changes in the details of construction, and in the form and arrangement of the parts, may be made without departing from the underlying idea or principles of this invention as defined by the scope of the appended claims.

GLOSSARY

[1] In machine translation, a natural language (e.g. English and Japanese) which is translated is called a "source language," and one which is generated is called a "target language."

[2] The term "argument" applies to a sentential element for which the predicate verb subcategorizes in relation to its "meaning completion." For example, in the sentence "He likes," the verb "like" requires other words (e.g. "English") for its meaning (i.e. "be fond of") to be completed. These "required other words" are considered as arguments.

The "completion" is determined in terms of a meaning of a word as well as a part of speech because a word usually has various meanings, and the number and characteristics of arguments differ according to the meanings. This application also regards a subject (SUB) to be an argument because it is required by a verb, and its characteristics vary according to verbs.

[3] The sentence pattern after passivization is actually SUB+be+V(p.p.), where "be" is a be-verb, and "V(p.p.)" is a past participle form of the corresponding verb. This application, however, regards a be-verb to be a part of a predicate.

[4] There are, however, various categoric setups and terms depending on grammarians; see Curme (1931), Jesperson (1937), and Fries (1952). All categoric setups are common in paying attention to the "syntactic form" and the "word order" of the arguments.

[5] An "adverbial particle" is defined to be an adverb which can exchange its position with a direct object (DOB). Many of them have the characteristics of being short and sharing the same morphology as a preposition.

[6] For example, noun phrase, that-clause, wh-clause, infinitive, and to-infinitive.

[7] For example, passive, relative, and emphatic transforms, heavy NP shift, and particle movement.

[8] Available VPs are usually extracted in the phase of "dictionary look-up" for all lexical items in the input sentence, and stored under the corresponding predicate. This phase is carried out at the initial stage of analysis, and all information which depends on lexical items (i.e. words) is extracted from the dictionary, including all available VPs to each lexical item in the input sentence. These VPs are referred to as "available VPs" in this application.

[9] "Feature-values" are values of linguistic features such as part of speech, syntactic form, number (singular/plural), person (1st/2nd/3rd), gender (masculine/feminine/neuter), agreement (with SUB/DOB), grammatical case, transform possibilities (passive, emphatic, and relative transforms), and semantic features (e.g. [+human]).

[10] The "candidate" refers to a portion of the input sentence which is hypothesized to correspond to a VP argument. The term "filler" is a more common term when the term "slot" is used for "argument." In order to form a candidate, words are first analyzed to the level of a phrase or a clause, because the predicate can immediately dominate only a phrase or a clause in the syntactic tree. A sentence portion may not correspond to a VP argument, because it can be an adverbial modifier or an adjectival modifier which is not subcategorized for by the predicate.

[11] The term "satisfy" means that all corresponding feature-values of the candidate and the argument match.

[12] "Backtracking" is an orthodox method used in top-down pattern matching to create a syntactic tree for an input. When more than one generation rule (pattern) is available to the focused node, a certain role (pattern) is hypothetically selected, and the matching process is carried out. However, when the matching fails, the process backtracks to the point where the ambiguity has appeared, and retries another possibility. This backtracking process continues until a generation rule (pattern) without a matching failure is detected.

[13] The patterns which are not affected by any transform are referred to as "basic patterns."

[14] The term, "slot table handling functions", is synonymous with the term "slot table handling function group" which is found in FIG. 1.

[15] An "input sentence" is a sentence which is used as an input to the natural language processing system as described briefly at the beginning. In an English analysis system, a "sentence" and a "word" can be defined as follows: A "sentence" is a string of words delimited by a period (.), an exclamation mark (!), or a question mark (?). A "word" is a string of letters delimited by a space and punctuation marks.

[16] To be more precise, "morphemes" are the smallest units of meanings. For simplicity of explanation, "words" are regarded as the smallest units in this application.

[17] More than one part of speech often is assigned to the same word, e.g., the word "process" can be either a noun or a verb. This part-of-speech ambiguity can be partially solved by looking at adjacent parts of speech in the input sentence. For example, the combination of an article and a verb in this order is not allowed in English.

[18] For simplicity of explanation, this word is referred to as a "predicate", supposing the ambiguity has been dissolved.

[19] A "finite number" means a restricted number. In the case of English it is four.

[20] A "slot table template" is a table containing information generalized for all cases of VPs. For example, the verbs "have" and "break" both have the VP of SUB+V+DOB, where the DOB is a noun phrase as in "I have a book" and "I broke a camera." However, the former cannot be passivized while the latter can. The general information is registered in the slot table template for the purpose of saving a memory space in the dictionary. Lexically dependent information, i.e. exceptional information to the generalized information, such as passivizability of this case, is registered in the dictionary.

[21] "Surface features" are morpho-syntactic features such as person, number, gender, transform possibilities, and agreement.

[22] "Deep features" are semantic and pragmatic features such as a semantic role, extension, and old/new information.

[23] As FIG. 4(a) and 4(b) show, there are many meanings corresponding to a verb, and there are many words corresponding to a meaning, which is expressed as "conceptual symbol" here.

[24] "Slot table handling functions" are functions which carry out the comparison between candidate's features and slot conditions described in the slot on the slot table, and return the result of the comparison. The result of the comparison of each slot with the candidate is described in each compared slot when necessary. This term is synonymous with the term "slot table handling function group" as previously noted.

[25] A "case marker" is a word which is attached immediately after an adnominal form of a word in Japanese, and shows a grammatical relationship with the predicate. It roughly corresponds to a grammatical case in English.

[26] "Shifting" is a kind of transforms found in Japanese. For example, the case marker "ga" changes to "ni" in passivization.

[27] "Conceptual dependency structure" is a semantic network representing the meaning of a sentence. Nodes represent concepts (or meanings), and arcs are directed and show semantic roles such as agent, object, instrument, target, and location.

[28] "Position information" is a numerical value of an argument's location determined in relation to the predicate. In the case of English, the values are 1, 2, 3, and 4.

[29] This order is in traditional grammar is known as "obliqueness hierarchy."

BIBLIOGRAPHY

Cowie, A. P.; Mackin, R. and McCaig, I. R. 1975 *Oxford Dictionary of Current Idiomatic English*. Oxford University Press.

Curme, G. O. 1931 *A Grammar of the English Language (SyntaX)*. New York, Tokyo.

Fillmore, Ch. J. 1968"The case for case." in: E. Back and R. T. Harms, *Universals in Linguistic Theory*. Holt, Rinehart and Winston, Chicago.

Fries, C. C. 1952 *The Structure of English*. N.Y., Harcourt.

Hornby, A. S. 1975 *Guide to Patterns and Usage in English,* 2nd ed., Oxford University Press.

Jesperson, Otto 1927 *A Modern English Grammar*. Heideberg, Copenhagen, London.

Jesperson, Otto 1937 *Analytic Syntax*. London, Chicago.

Palmer, H. E. 1951 *A Grammar of English Words*. London (Longmans), Tokyo.

Quirk, Randolph; Greenbaum, Sidney; Leech, Geoffrey and Svartvik Jan. 1972 *A Grammar of Contemporary English*. Longman Group UK Ltd.

Quirk, Randolph; Greenbaum, Sidney; Leech, Geoffrey and Svartvik, Jan. 1985 *A Comprehensive Grammar of the English Language*. Longman Group UK Ltd.

What is claimed is:

1. A natural language processing system for recognizing sentence patterns (VPs) and grammatical cases comprising:

means for providing a slot table which contains all VPs available to a predicate in an input sentence arranged in plural rows, and which contains arguments of the VPs expressed as slot conditions in slots positioned in a finite number of positions;

a grammatical case pattern table which contains columns corresponding to grammatical cases that are arranged in the objective word-order found among grammatical cases in declarative sentences, and which contains all grammatical case patterns expressed as binary representations of existing/non-existing ones of grammatical cases in the rows corresponding to the grammatical case patterns;

means for converting position information for arguments of a VP to grammatical cases on the grammatical case pattern table, which includes means for adding up numerical values, representing existing/non-existing ones of grammatical cases for the grammatical case patterns corresponding to VPs, until the sum of the numerical values adds up to the number of the position information in a basic pattern, and which treats as grammatical cases of the arguments of the VP only those grammatical cases corresponding to columns that correspond to the last number among the numerical values that have been added up; and means for processing a plurality of VPs in parallel, which includes means for comparing features of a candidate for arguments of VPs in the input sentence with corresponding slot conditions of the slots which belong to a selected position on the slot table through all available VPs, which recognizes as matched VPs only VPs that have a slot where each of all compared slot conditions shares the same value with the corresponding feature of the candidate, and which recognizes as matched grammatical cases only grammatical cases that have been described in the slots of the matched VPs.

2. A natural language processing system for recognizing sentence pattern (VPs) and grammatical cases as claimed in claim 1, wherein the positions on the slot table are set by the locations of arguments in relation to the predicate.

3. A natural language processing system for recognizing sentence patterns (VPs) and grammatical cases as claimed in claim 1, wherein the positions on the slot table are set by case markers.

4. A natural language processing system for recognizing sentence patterns (VPs) and grammatical cases as claimed in claim 1, wherein the means for providing the slot table comprises means for extracting all VPs available to a predicate in an input sentence, a slot table template, and means for converting information on the VPs for the predicate to slot conditions on a slot table by using the slot table template.

5. A natural language processing system for recognizing sentence patterns (VPs) and grammatical cases as claimed in claim 1, wherein the means for comparing the candidate's features with the slot conditions of all available VPs in slots in a selected position comprises means for handling the slot table by slot table handling functions.

6. A natural language processing system for recognizing sentence patterns (VPs) and grammatical cases as claimed in claim 1, wherein existing/non-existing grammatical cases are expressed as 1/0, respectively.

* * * * *

UNITED STATES PATENT AND TRADEMARK OFFICE
CERTIFICATE OF CORRECTION

PATENT NO. : 5,418,716

DATED : May 23, 1995

INVENTOR(S) : Hiroshi Suematsu

It is certified that error appears in the above-identified patent and that said Letters Patent is hereby corrected as shown below:

Column 8, line 24, delete "untilled", and insert --unfilled--;

Column 8, line 28, delete "untilled", and insert --unfilled--.

Signed and Sealed this

Thirtieth Day of April, 1996

Attest:

BRUCE LEHMAN

Attesting Officer

Commissioner of Patents and Trademarks